F. A. LANE.
MILKING MACHINE.
APPLICATION FILED MAY 17, 1909.
951,403.
Patented Mar. 8, 1910.
3 SHEETS—SHEET 1.
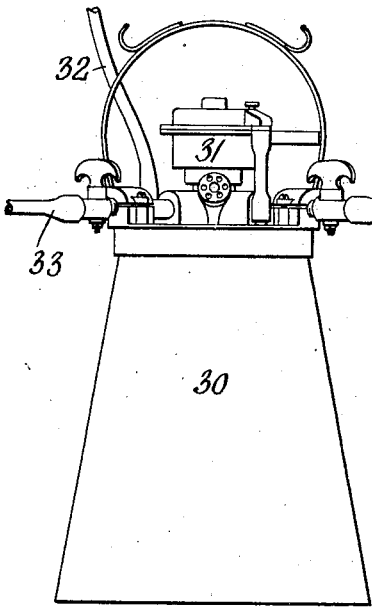
Fig. 1.
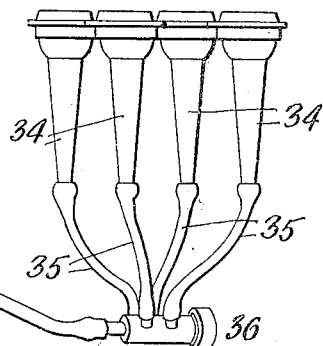
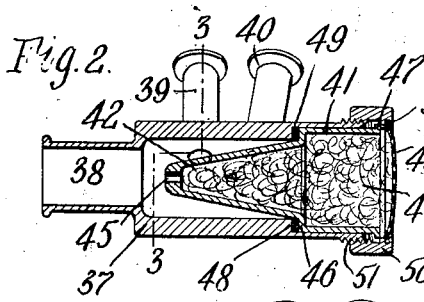
Fig. 2. Fig. 3.
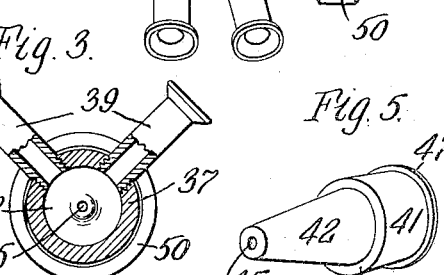
Fig. 4.
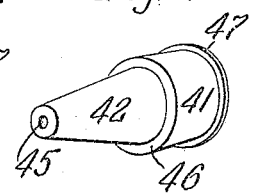
Fig. 5.
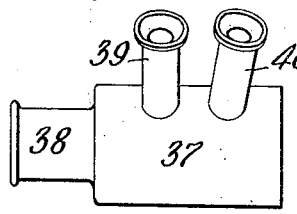
Fig. 6.
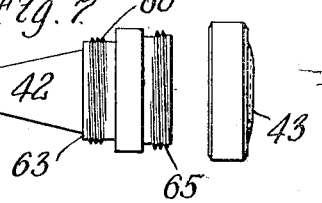
Fig. 7. Fig. 8.
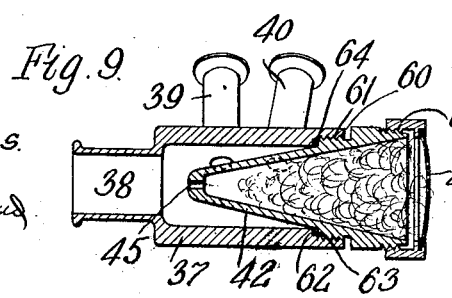
Fig. 9.
Witnesses
A. G. Dimond
E. A. Volk
Inventor
Frederic A. Lane,
By Whelm, Parker & Hurd,
Attorneys

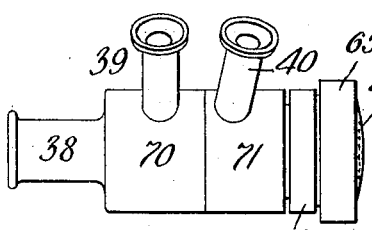
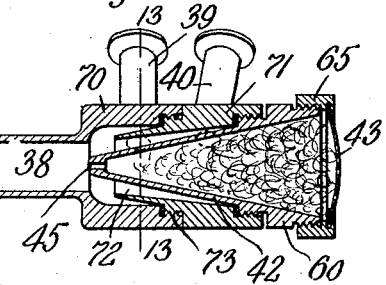
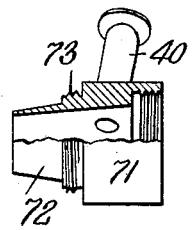
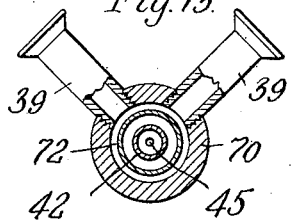
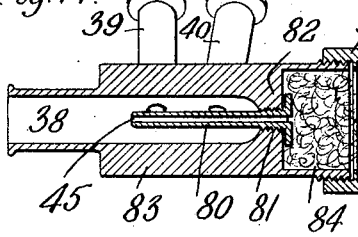
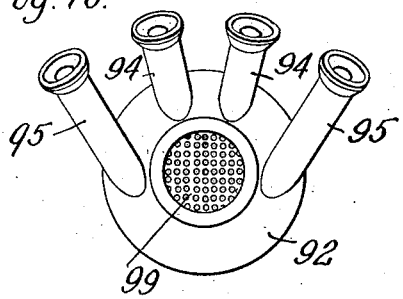
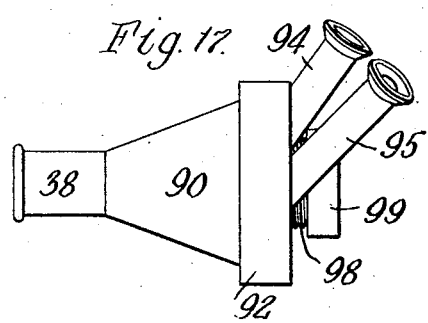
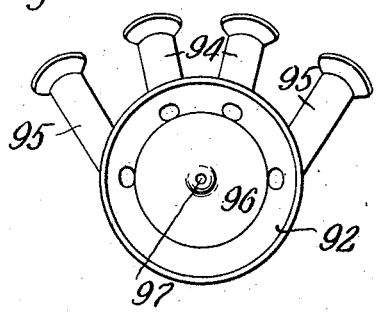

F. A. LANE.
MILKING MACHINE.
APPLICATION FILED MAY 17, 1909.

951,403.

Patented Mar. 8, 1910.
3 SHEETS—SHEET 3.

Witnesses.
A. G. Dimond.
E. A. Volk

Inventor:
Frederic A. Lane,
By Wilhelm, Parker & Hurd
Attorneys.

UNITED STATES PATENT OFFICE.

FREDERIC A. LANE, OF LITTLE FALLS, NEW YORK, ASSIGNOR TO D. H. BURRELL & COMPANY, OF LITTLE FALLS, NEW YORK.

MILKING-MACHINE.

951,403.   Specification of Letters Patent.   Patented Mar. 8, 1910.

Application filed May 17, 1909. Serial No. 496,620.

*To all whom it may concern:*

Be it known that I, FREDERIC A. LANE, a citizen of the United States, residing at Little Falls, in the county of Herkimer and State of New York, have invented a new and useful Improvement in Milking-Machines, of which the following is a specification.

This invention relates to that class of milking machines which comprise teat cups to which suction is applied and in which each set of teat cups, usually four, is connected with a pipe leading to the milk pail by a connector or coupling which is provided at its front or delivery end with a main suction nipple for connection with the milk pipe leading to the pail, and rearwardly of its delivery end with a plurality of nipples for connection with the pipes leading from the teat cups to the connector. In this class of machines, the suction is usually applied to the milk pail and acts from the latter through a pulsator valve intermittently upon the pipe extending from the pail to the connector and from the latter through the individual pipes to the several teat cups. Air is admitted to the connector constantly for relieving the partial vacuum in the cups when the suction is cut off by the pulsator valve, but the air inlet is so restricted that the suction effect is not materially impaired by this admission of air when the pulsator valve is open. A milking machine of this general character is described and shown in my Patent No. 828,613, August 14, 1906.

The objects of this invention are to improve the construction of the connector in such a way that the suction is applied efficiently, evenly and satisfactorily to the teats, that a large chamber is provided within the connector for filtering the air which is admitted to the same, that the parts of the connector can be readily separated for cleaning, and that the connector produces a noise when milk is flowing through the same which is audible at a distance and serves to keep the attendant informed as to the flow of milk.

Figure 20:
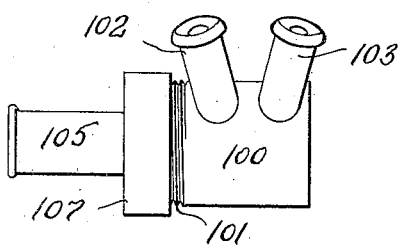
Figure 21:
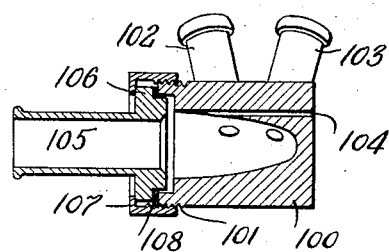
Figure 22:
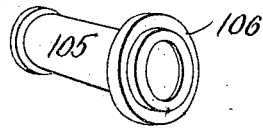
Figure 23:
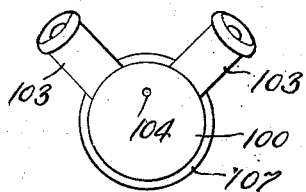
Figure 24:
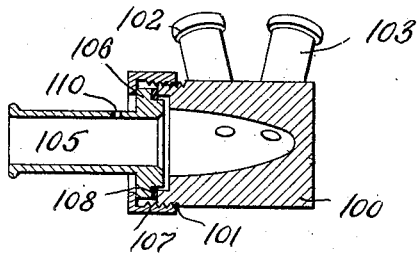

In the accompanying drawings, consisting of three sheets: Figure 1 is an elevation of a milking machine embodying this invention, the figure representing one set of teat cups connected with the pulsator and pail by the improved connector. Fig. 2 is a longitudinal sectional elevation of the preferred construction of the connector. Fig. 3 is a transverse section in line 3—3, Fig. 2. Fig. 4 is a top plan view of the connector. Fig. 5 is a detached perspective view of the core of the connector. Fig. 6 is a side elevation of the body portion of a modified construction of the connector, Fig. 7 a side elevation of the core portion, Fig. 8 a side elevation of the air inlet cap, and Fig. 9 a longitudinal sectional elevation thereof. Fig. 10 is a side elevation, and Fig. 11 a longitudinal sectional elevation of another modified construction of the connector. Fig. 12 is a detached side elevation, partly in section, of the rear body portion of this connector, and Fig. 13 is a transverse section in line 13—13, Fig. 11. Fig. 14 is a longitudinal sectional elevation of another modified construction of the connector, and Fig. 15 is a detached perspective view of the core portion of this connector. Fig. 16 is a rear elevation of another modified construction of the connector, Fig. 17 a side elevation thereof, Fig. 18 a front elevation thereof with the body portion removed, and Fig. 19 a longitudinal sectional elevation thereof. Fig. 20 is a side elevation of another modified construction of the connector, Fig. 21 is a longitudinal sectional elevation thereof. Fig. 22 is a detached perspective view of the main suction nipple thereof, and Fig. 23 is a rear elevation thereof. Fig. 24 is a longitudinal sectional elevation of another modified construction of the connector.

Like reference characters refer to like parts in the several figures.

30 represents the milk pail, 31 the pulsator mounted on the same, 32 the main suction pipe which connects the pail with a vacuum pump or other exhaust apparatus of usual construction, (not shown), 33 two main milk pipes connected with the pulsator in the usual way, one pipe for each set of teat cups 34, 35, the individual teat cup pipes, and 36 the connector by means of which these individual pipes are placed in communication with the main milk pipe 33.

37 represents the body of the connector which has the form of a horizontal cylinder and is provided at its front or delivery end with a main suction nipple, short tube or passage 38 for connection with the main milk pipe 33, and in its upper portion with two upwardly projecting front nipples or connections 39 and two similar rear nipples or connections 40, for connection with the four individual teat cup pipes 35. These nipples or connections may, however, be arranged in any other suitable manner.

The connector is provided with a hollow core which comprises a cylindrical rear portion 41 and a conical or tapering front portion 42. The rear end of this core is covered by a perforated cap 43 through which air is drawn into the core by the suction. The core is filled with cotton or other material 44 suitable for filtering the air and the latter issues through an opening 45 formed in the front end or tip of the tapering portion 42. This air supply opening is located forwardly of the individual nipples connected with the teat cups or between the main suction nipple and the individual nipples, and the stream of air issuing from this opening into the cavity of the connector and flowing forwardly to the main suction nipple at the front end of the connector has an injector effect and assists materially in drawing the milk from the individual nipples into the connector and propelling it toward the main suction nipple and the main milk pipe connected therewith.

The space or cavity of the connector into which the individual nipples open tapers or is contracted rearwardly by reason of the forwardly tapering or rearwardly flaring form of that portion of the core which extends into that portion of the connector into which these nipples open. This rearward contraction or taper of the cavity equalizes to a considerable extent the suction between the front and rear pairs of individual nipples and avoids an excessive suction on the front pair of nipples and teat cups and a low suction on the rear pair. An excessive suction is objectionable because it tends to impair the circulation of the blood in the teats, causing a hardening thereof and discomfort to the cow, and an insufficient suction is objectionable because it reduces the speed with which the milk is drawn from the teats and does not milk dry.

The forwardly flaring or enlarging form of the cavity or flow space for the milk between the core and the body of the connector also causes the milk to fill the space nicely during the suction period, as the rear nipples deliver the milk to the narrow rear part of the flow space and the front nipples deliver the milk to the wider front part, which receives the milk both from the front and rear nipples. When this space is empty the suction acts with full strength upon all of the nipples and teat cups, but when the flow space is partly or wholly filled by the flowing milk the suction is correspondingly reduced. The suction becomes less as the flow increases and greater as the flow decreases, the variation depending upon the vacant space which is unoccupied by flowing milk. The suction responds in this manner automatically to a certain extent to the manner in which the cow gives the milk, the suction becoming stronger as the milk flows less freely and weaker as the flow increases.

The air supply opening at the tip of the core is preferably of such size that the vacuum in the teat cups will be fully relieved, or nearly so, when the suction is cut off by the pulsator valve. The vacuum in the milk pail is usually kept at about fifteen inches and the vacuum should vary in the teat cups from zero or slightly above during the relief period, when the suction is cut off by the pulsator valve, to the vacuum carried in the pail, when the suction is applied to the teat cups and no milk is flowing through the connector. When the milk is flowing the suction in the cups drops more or less in accordance with the flow, usually to about ten inches when the milk is flowing freely. This drop in the suction action on the teat cups does not, however, retard the flow of milk to the pail. With a pulsator valve having ports of about one-half of an inch in diameter and making about 55 double strokes per minute, and a main milk pipe having about three-eighths of an inch inside diameter, an air supply opening of from 0.05 to 0.07 inches in diameter will give good results.

When the milk is flowing through the connector a noise is produced by the commingling of the currents of air and milk which is audible at a considerable distance and which resembles the noise which is made by a person drawing air in forcibly at the mouth together with a liquid. This noise is probably caused by reason of the fact that the air current enters the cavity of the connector at the tip of the core within the annular milk current which surrounds this tip and agitates or vibrates this milk current. This noise is audible at a considerable distance and when it becomes diminished or ceases it indicates to the operator that the flow of milk through the connector has become diminished or has ceased. This noise is therefore useful in keeping the attendant informed as to the flow of the milk from the different sets of teat cups which are in operation at the same time and it is also believed to induce the cows to give the milk more freely.

The core is preferably produced seamless by drawing it from a blank of sheet metal, and has an external shoulder 46 at the junction of its cylindrical and tapering portions and an external flange 47 at its rear end. The body of the connector is provided with an internal shoulder 48 which faces the shoulder 46 of the connector, and a packing ring 49 is placed between these shoulders. The rear end of the body is provided with an external screw-thread 50 for the reception of the perforated cap 43 which is provided with a screw-thread 51. The cap is further provided with an internal flange 52 which bears against the flange 47 at the rear end of the core and presses the core forwardly, thereby pressing the shoulder of the core tightly against the packing ring and the latter against the shoulder of the body, whereby a tight closure is formed at the rear end of the cavity of the body.

The hollow core forms a comparatively large holder for filtering material, without materially increasing the size of the connector. The annular space or pocket which is formed in the connector around the air supplying core tends to keep the filtering material dry because this space prevents the milk from entering the chamber through the tip, particularly during the relief period or when the pulsator valve moves very slowly, and further it prevents milk which has remained in the connector or tubes from running into the filter chamber when the machine is carried about. Upon removing the cap the core can be removed from the body of the connector and the parts can be readily cleaned.

As the air inlet is located forwardly of the individual nipples which connect with the teat cups the relieving air is acted upon by the suction before the latter reaches the individual nipples and this air forms a cushion which prevents any excessively sudden or violent action of the suction on the individual nipples and the teat cups.

In the modified construction of the connector represented in Figs. 6-9, the core is secured in the body of the connector by means of an external screw-thread 60 formed on the core and an internal thread 61 formed in the rear portion of the body. The latter is provided with an internal shoulder 62 at the front end of the screw-thread 61 and the core is provided with a corresponding shoulder 63. A packing ring 64 is arranged between these shoulders. The rear portion of the core extends beyond the rear end of the body and is provided with an external screw-thread 65 to which the perforated cap 43 is applied. The cavity of the core flares from the front to the rear end.

In the modified construction represented in Figs. 10-13, the core is constructed and secured in the rear end of the body, as in the construction represented in Figs. 6-9, but the body is made in two parts, a front part 70 and a rear part 71. The front part is provided with the main nipple 38 and the two individual front nipples 39, while the rear part is provided with the rear nipples 40 and carries further a supplemental annular deflector 72 which tapers forwardly and which is located between the tapering core and the cylindrical wall of the connector. This supplemental deflector connects with the cylindrical wall in rear of the front nipples and the rear nipples open through the rear portion of this deflector, so that the milk entering from the rear nipples flows through the annular space between the core and the supplemental deflector, while the milk entering from the front nipples flows through the space between the deflector and the cylindrical wall of the connector. The front and rear portions of the body are connected by a screw joint 73.

In the modified construction represented in Figs. 14 and 15, the core has the form of a practically straight tube 80 which is secured by a screw joint 81 in the rear wall 82 of the body 83 of the connector. The cavity of the latter may be cylindrical, and in that case the core would not possess the advantages resulting from the rearwardly contracted cavity but would possess the advantages which result from the admission of the air within the body and at a point forwardly of the individual nipples. The rear portion of the body forms a chamber 84 for the filtering material to which the cap 43 is attached.

In the modified construction represented in Figs. 16-19, the individual nipples are all arranged at their lower ends, where they open into the cavity of the connector, at the same distance from the front end of the connector, whereby the equalization of the suction upon the several nipples and teat cups is greatly facilitated. The body 90 of this connector flares rearwardly and is provided at its rear end with an external screw-thread 91 to which the rear head 92 is connected by a screw-thread 93. The front nipples 94 and rear nipples 95 open through the head 92 near the periphery thereof and outside of a conical or forwardly tapering core 96 which projects forwardly from the head 92 and is provided at its apex with the air supply opening 97. The head is provided on its rear side with an externally threaded collar 98 to which the perforated cap 99 is secured and which forms with the cavity of the core a receptacle for the filtering material. The milk flows from the individual nipples forwardly through the annular space between the conical body and the core and the air-jet enters the cavity of the body through the opening at the apex or tip of the core, which is located at a considerable distance forwardly of the individual nipples.

In the modified construction represented in Figs. 20-23, the body 100 of the connector is closed at the rear end and open at the front end where it is provided with an external screw-thread 101. The cavity of the body tapers rearwardly and the front nipples 102 and rear nipples 103 open into the same. An air inlet pasage 104 extends from the rear end of the body forwardly and opens into the cavity of the body forwardly of the front nipples. The main nipple 105 is separate from the body and provided at its rear end with a flange 106 which is engaged by a screw collar 107, by means of which the main nipple is secured to the body. A packing ring 108 is interposed between the parts.

In the modified construction represented in Fig. 24, the same construction of parts is employed as in Figs. 20–23, with the exception of the air inlet passage which, in Fig. 24, consists of an opening 110 formed in the main nipple near the inner end thereof. This construction and that represented in Figs. 20–23 lacks provision for filtering the air and is inferior in that respect. The delivery end of the connector is herein designated as the front end thereof.

I claim as my invention:

1. A connector for milking machines having a main suction passage and teat cup connections and having an air supply passage opening into the cavity of the connector forwardly of said teat cup connections, substantially as set forth.

2. A connector for milking machines having a cavity provided with a main suction passage at its front end, teat cup connections opening into said cavity forwardly of the rear end thereof, and an air supply passage extending from the rear end of said cavity forwardly to a point adjacent to said connections, substantially as set forth.

3. A connector for milking machines having a main suction passage and teat cup connections and having an air supply passage opening into the cavity of the connector between said main suction passage and said teat cup connections, substantially as set forth.

4. A connector for milking machines comprising a cavity having a main suction passage at its front end, teat cup connections opening into said cavity forwardly of the rear end thereof, and an air supply passage having its delivery end arranged within said cavity and adjacent to the front portions of the teat cup connections, substantially as set forth.

5. A connector for milking machines comprising a main suction passage and teat cup connections and having internal means for producing an annular milk current in the connector and admitting an air current within said milk current, substantially as set forth.

6. A connector for milking machines comprising a main suction passage and teat cup connections and having an internal, noise-producing air supply device, substantially as set forth.

7. A connector for milking machines having a main suction passage and teat cup connections and having a hollow core which is arranged within the cavity of the connector and is provided with means for admitting the external air and an outlet through which the air passes from the core into the milk space of the connector, substantially as set forth.

8. A connector for milking machines comprising a main suction passage at the front end of the connector, teat cup connections arranged in rear of said passage, and a hollow core which tapers forwardly and is provided at its large rear end with means for admitting the air and at its small front end with an opening through which the air issues into the cavity of the connector, substantially as set forth.

9. A connector for milking machines having a cavity provided with a main suction passage at its front end, teat cup connections opening into said cavity forwardly of the rear end thereof, and an air supplying core extending from the rear end of said cavity forwardly into the same, substantially as set forth.

10. A connector for milking machines comprising a main suction passage, teat cup connections, and an air supplying core arranged within the cavity of the connector and tapering toward the main suction passage, substantially as set forth.

11. A connector for milking machines comprising a body having a main suction passage, teat cup connections and an internal shoulder, an air supplying core arranged within said body and provided with an external shoulder facing the internal shoulder of the body, and a cap for securing the core on the body, substantially as set forth.

12. A connector for milking machines comprising a body having a main suction passage, teat cup connections and an internal shoulder, an air supplying core arranged within said body and comprising a cylindrical rear portion adapted to seat itself against said shoulder and a tapering front portion provided with an air passage at its small end, and a cap applied to the rear end of said body and securing the core to the same, substantially as set forth.

13. A connector for milking machines comprising a body having a main suction passage and teat cup connections, and a hollow air supplying core adapted to hold filtering material, substantially as set forth.

14. A connector for milking machines comprising a body having a main suction passage and teat cup connections, and an air supplying core arranged within said body and having a flow space between the body and core into which said teat cup connections open and which is contracted rearwardly from said main suction passage, substantially as set forth.

15. A connector for milking machines comprising a cylindrical body having a main suction passage at one end and teat cup connections opening into the cavity of the body, and an air supplying core extending forwardly from the rear end of said body and tapering toward said main suction passage, thereby forming a rearwardly contracted flow space between the cylindrical wall of the body and the core, substantially as set forth.

Witness my hand in the presence of two subscribing witnesses.

FREDERIC A. LANE.

Witnesses:
CHAS. B. DALZELL,
LOOMIS BURRELL.